United States Patent [19]
Jenkins

[11] 3,844,509
[45] Oct. 29, 1974

[54] AIR CUSHION TRUNK VALVING SYSTEM FOR AIRCRAFT

[75] Inventor: Dave H. Jenkins, Marietta, Ga.

[73] Assignee: Lockheed Aircraft Corporation, Burbank, Calif.

[22] Filed: Oct. 15, 1973

[21] Appl. No.: 406,656

[52] U.S. Cl.............. 244/100 A, 180/124, 180/125, 180/128
[51] Int. Cl............................................. B60v 3/08
[58] Field of Search .......... 180/124, 128, 125, 116; 137/494, 525.3, 625.28; 244/100 A, 100 R, 105; 114/67 A; 280/150 AB

[56] References Cited
UNITED STATES PATENTS

| | | | |
|---|---|---|---|
| 3,414,077 | 12/1968 | Earl | 180/128 |
| 3,524,517 | 8/1970 | LaFleur | 180/124 |
| 3,618,695 | 11/1971 | Wheeler | 180/124 X |

Primary Examiner—Trygve M. Blix
Assistant Examiner—Paul E. Sauberer
Attorney, Agent, or Firm—Billy G. Corber; John J. Sullivan

[57] ABSTRACT

The inflatable trunk of an air cushion landing system has many small holes distributed over its bottom surface to produce an air bearing between the trunk and the ground during ground operations. The holes, located inside of the trunk/ground tangent point, vent air into the cavity under the aircraft to support it, while the holes located outside of the trunk/ground tangent point contribute nothing toward aircraft support but are needed to provide an air bearing between the trunk and ground when the trunk flattens out during take-off rotation, landing impact and roll conditions.

5 Claims, 5 Drawing Figures

AIR CUSHION TRUNK VALVING SYSTEM FOR AIRCRAFT

This valving device is installed over the holes, located outside of the trunk/ground tangent point, to prevent air flow through the holes until they are needed. Due to the large number of holes, the reduction in airflow could reduce the horsepower requirements of the system by as much as 40 percent.

The valving device is composed of many small rigid or semi-rigid plates that are preformed to the curvature of the inflated trunk and are installed on the inside surface of the trunk over each hole located outside of the trunk/ground contact point. The inboard end of each valve plate is securely attached to the trunk in a non-hinging fashion so that each plate covers one hole. As the trunk flattens out during ground contact the valve plates remain in a curved rigid condition, thereby creating a separation of valve plate and trunk wall. This action allows air to flow through the air holes in the trunk to produce the required air bearing.

This invention relates to inflatable trunks as employed on aircraft as undercarriages to contain air and to discharge it into a confined area beneath the aircraft where it acts as a cushion on and against a reaction surface to support the aircraft when it is in close proximity to such surface, as during ground operations, and more particularly to an air control arrangement or valving system designed and adapted for incorporation in such trunks for the more efficient discharge of air therefrom whereby improved aircraft performance results.

The air under pressure employed in air cushion landing systems for aircraft is at a premium whether obtained as bleed-off from the engine or engines, the primary source of propulsion of the aircraft, or from a secondary on-board power source. It is, therefore, judicious to control its use, i.e., limit its use to a minimum and yet assure an abundance thereof is available when needed.

At the same time, the means provided to effect such control must be such as not to constitute an unreasonable burden on the aircraft either in the form of added weight or added space requirements. This, of course, is in addition to its reliability of operation, ease of maintenance, and the usual attributes of such aircraft accessories especially those critical to its operation.

The present invention contemplates satisfying the foregoing and other stringent requirements and to this end proposes an air control arrangement or valving system which may be readily installed and maintained. Moreover, this proposed control is characterized by its lack of moving parts constituting a completely uncomplicated arrangement operable concurrently with, and in response to, the normal operation of the trunk itself. In this way, it imposes no additional burden on the otherwise conventional air cushion landing system or on the aircraft.

The control herein proposed forms an integral part of the trunk assembly when installed and operative where it serves to automatically close a predetermined portion of the aggregate air discharge opening from the trunk when the trunk is fully inflated and uncompressed. Upon normal compression of the inflated trunk, however, accompanying ground or surface effect, the present control automatically opens the entire aggregate air discharge opening. Thus, the quantity of air discharged under pressure from the trunk is made to correspond directly to that required at the particular time and under the particular aircraft operational conditions.

More specifically, the trunk is provided with a multiplicity of holes in its wall adjacent the supporting surface to provide an evenly distributed air bearing between the undersurface of the aircraft defined by the trunk and the surface during so-called ground operations, i.e., operation in close proximity to any supporting surface. These holes are located around the trunk's periphery inside and outside of the point of tangency between the trunk and the supporting surface. The holes located outside the trunk/surface tangent point contribute nothing toward aircraft support until it approaches the surface to a point where the aircraft is affected by the air discharge against the surface. According to this invention the holes located outside the surface tangent point are eliminated, in effect, by overlying plates contoured to the trunk periphery. As the trunk flattens when it is in close proximity to the surface, as during take-off rotation, landing touchdown, and roll maneuver, however, these plates automatically uncover the holes to provide the necessary air bearing to prevent ground friction. These maneuvers are of very short duration so by opening the holes only when needed the system power requirements are greatly reduced.

With the above and other objects in view as will be apparent, this invention consists in the construction, combination, and arrangement of parts, all as hereinafter more fully described, claimed and illustrated in the accompanying drawings, wherein:

FIG. 1 is a perspective view from below of an aircraft equipped with an air cushion trunk shown in the fully inflated condition as it would appear when the aircraft is airborne and outside of surface effect to show generally the trunk and the air discharge holes in the periphery thereof;

FIG. 2 is a schematic transverse section taken through the fully inflated trunk of the aircraft of FIG. 1 showing the periphery thereof with reference to a supporting surface with the several holes located outside the surface tangent point closed to limit the passage of air through those holes located in the trunk wall on the inside of the surface tangent point; the surface tangent point being indicated by a phantom line;

Figure 1:
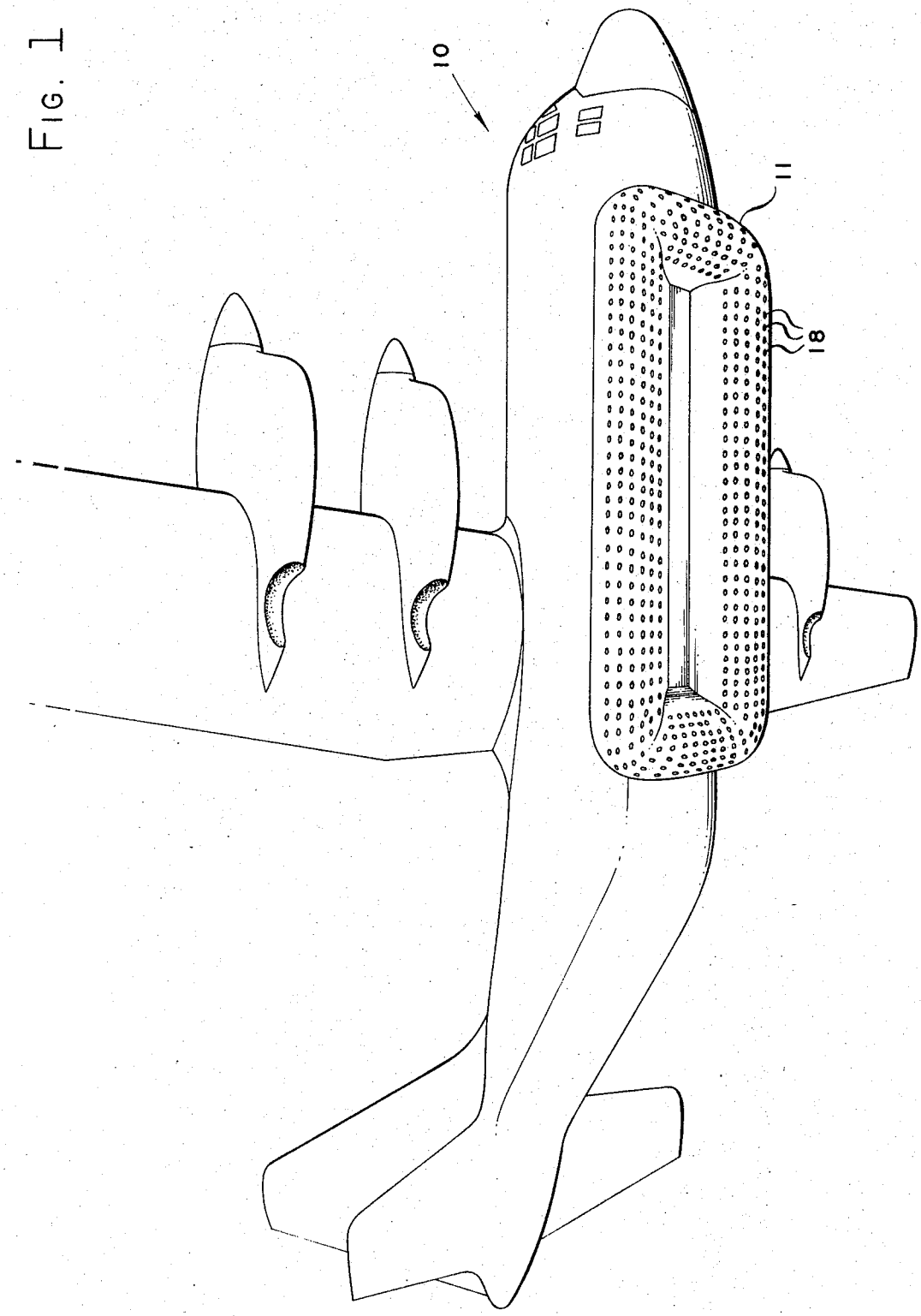

Referring more particularly to the drawings, 10 designates a typical aircraft as modified in accordance with the teachings of this invention to include on air cushion landing gear system in lieu of the more conventional undercarriage. This air cushion is formed by an inflatable trunk 11 secured in appropriate manner as simply illustrated at 12 on the underside or belly of the aircraft 10. The trunk 11 is designed and adapted to be inflated by air under pressure from any suitable source such as, for example, a fan 14 or the equivalent onboard the aircraft 10.

Thus, pressurized air is ducted or otherwise delivered to the interior of the trunk 11 as at 15 whereupon the trunk 11 expands arcuately with the outermost surface establishing virtually a point of tangency to a support surface 17 during ground operations including take-off and landing. This point of tangency is located at and along the length of the trunk indicated by a line 16.

The wall of the trunk 11 is pierced by a multiplicity of holes 18 some located on each side of the tangency line 16. Pressurized air when exhausted through these holes 18 is thereby directed simultaneously into the cushion area 19 inside the line 16 and into the atmospheric area 20 outside the point 16.

Figure 2:
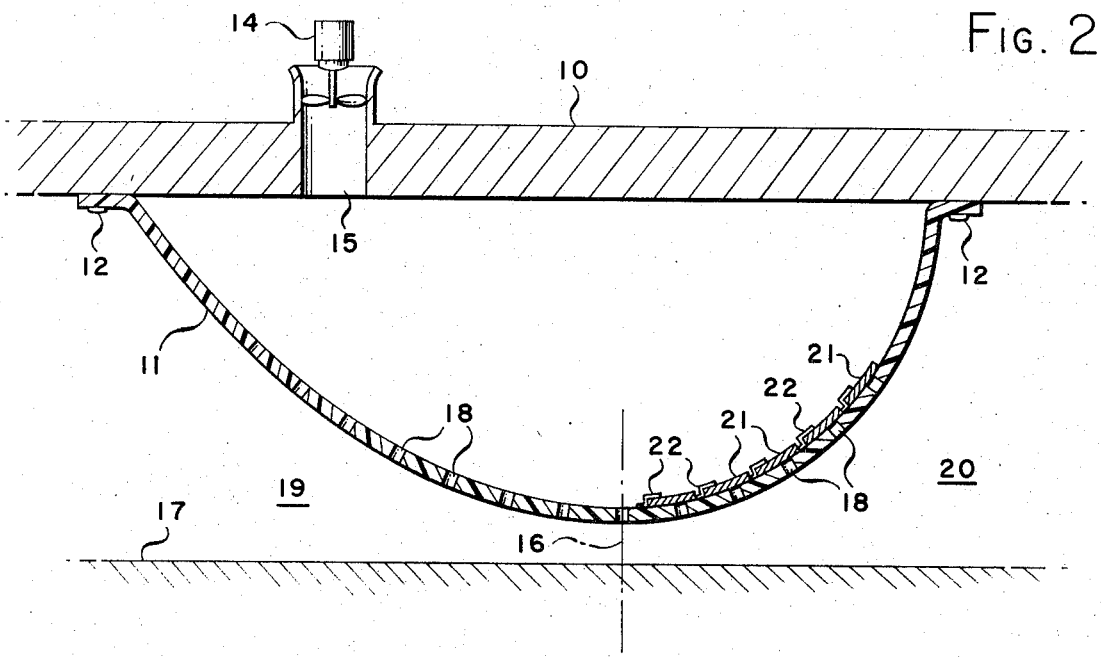
Figure 3:
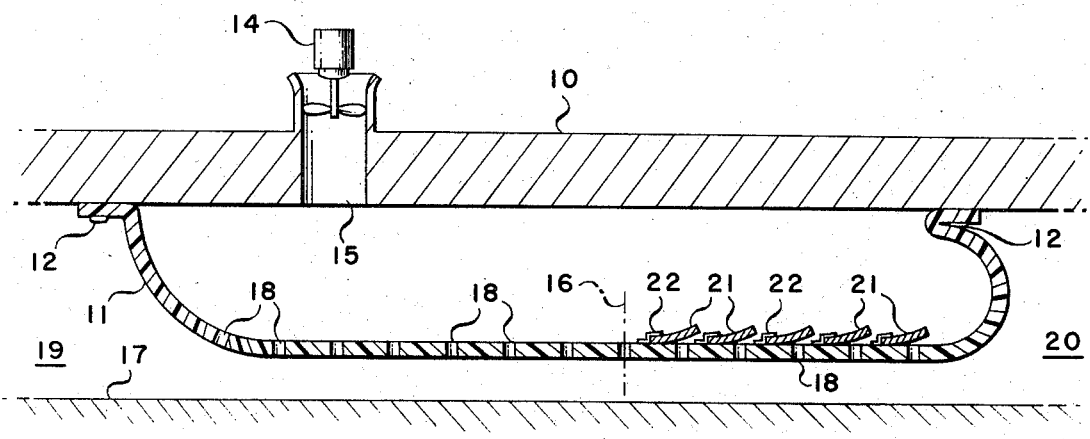
FIG. 3 is a view similar to FIG. 2 showing the fully inflated trunk compressed as occurs when the aircraft is in surface effect during landing touchdown, take-off rotation or roll maneuver and all of the holes in the trunk are fully open for the discharge of air therethrough resulting in an air bearing at and along the entire adjacent surface.
Figure 4:
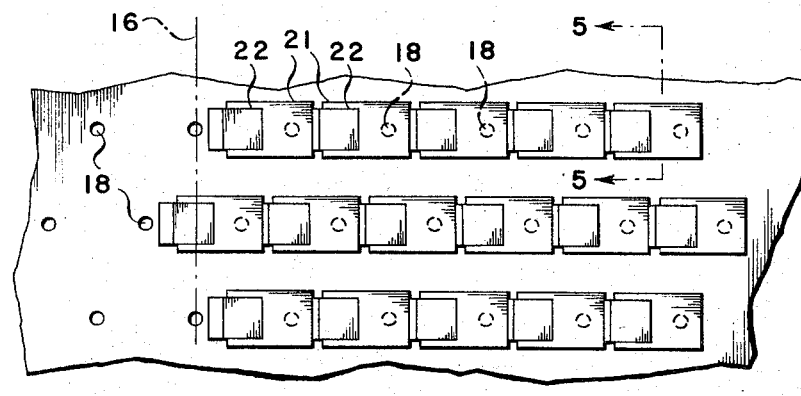
FIG. 4 is a plan view of a fragment of the trunk taken from the interior thereof to show several of the holes located in the wall thereof on the outside of the surface tangent point (indicated by a phantom line) and the cover plates associated therewith.
Figure 5:
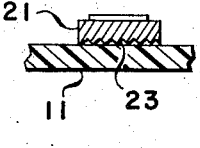
FIG. 5 is a section taken along line 4—4 of FIG. 4.

Associated with each of the holes 18 located outside of the tangency line 16 is a plate valve 21 contoured to conform to the curvature of the trunk 11 when fully inflated and unsuppressed as shown in FIG. 2. One end of each plate 21 is secured as at 22 in suitable fashion to the adjacent trunk wall. The material of each plate 21 is such that it remains rigid at all times, and thereby preserves the curvature of, the inner trunk wall when the trunk 11 is inflated and unsuppressed. Pressurized air in the trunk 11 is thus prevented from discharge through the holes 18 into the area 20 and all discharged air is directed into the air cushion area 19.

As the aircraft 10 approaches the surface 17, however, the trunk 11 is made to compress, flattening the trunk wall, i.e., disposing it generally parallel to the surface 17. The several plates 21 are thereby automatically displaced from abutment with the inner trunk surface, and pressurized air is allowed to discharge through the associated holes 18 into the atmospheric area 20. An air bearing is thus provided at and along the entire trunk 11 proximate the surface 17.

In order to assure separation of the several plates 21 from the associated portions of the trunk 11 defining the holes 18 the adjacent surface of each plate 21 may be scored or otherwise provided with surface irregularities as indicated at 23. Thus air within the trunk 11 when inflated may freely pass into the grooves or striations 23 and thereby prevent negative pressures causing the trunk 11 to adhere to the plates 21.

While the invention has been hereinabove illustrated and described in what is believed to be its preferred embodiment, other structural arrangements will suggest themselves to those skilled in the art and depending on the particular application. Such other arrangements are intended to fall within the scope of the invention as set forth at the outset of this specification and in the appended claims.

What is claimed is:

1. In an aircraft landing gear system, the combination with an inflatable air cushion trunk mounted on the underside of said aircraft and a source of air under pressure connected to the interior of said trunk for the expansion thereof in an arcuate shape locating the outermost wall of said trunk substantially tangential to a reaction surface during operations of the aircraft in proximity with such surface, of an opening piercing the trunk wall on each side of the point of tangency aforesaid, and a cover normally overlying and closing said opening on the outside of said aircraft with respect to said tangency point, said cover being moved out of the normal position aforesaid to a position uncovering said outside opening in response to deflection of said outermost trunk wall to a position substantially parallel with said reaction surface.

2. The combination of claim 1 wherein each said opening includes a multiplicity of holes.

3. The combination of claim 1 wherein said cover includes a plate secured to the trunk wall adjacent the aforesaid outside opening fabricated of relatively rigid material and contoured to conform to the curvature of said trunk when inflated and unsuppressed.

4. The combination of claim 2 wherein said cover includes a plate secured to the inner trunk wall adjacent each of said outside holes, each said plate being fabricated of relatively rigid material and contoured to conform to the curvature of said trunk when inflated and unsuppressed.

5. The combination of claim 3 wherein said plate includes surface irregularities adjacent said trunk wall permitting the passage of air.

* * * * *